US009752577B2

(12) United States Patent
Novi et al.

(10) Patent No.: US 9,752,577 B2
(45) Date of Patent: Sep. 5, 2017

(54) VARIABLE-DISPLACEMENT LUBRICANT VANE PUMP

(75) Inventors: Nicola Novi, Pisa (IT); Jerome Maffeis, Metz (FR)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 895 days.

(21) Appl. No.: 13/812,519

(22) PCT Filed: Jul. 29, 2010

(86) PCT No.: PCT/EP2010/060993
§ 371 (c)(1),
(2), (4) Date: Feb. 18, 2013

(87) PCT Pub. No.: WO2012/013232
PCT Pub. Date: Feb. 2, 2012

(65) Prior Publication Data
US 2013/0136641 A1    May 30, 2013

(51) Int. Cl.
| F04C 14/22 | (2006.01) |
| F16N 13/20 | (2006.01) |
| F01M 1/02 | (2006.01) |
| F01M 1/16 | (2006.01) |
| F04C 2/344 | (2006.01) |

(52) U.S. Cl.
CPC ............. F04C 14/223 (2013.01); F01M 1/02 (2013.01); F01M 1/16 (2013.01); F04C 14/226 (2013.01);
(Continued)

(58) Field of Classification Search
CPC .......... F04C 14/20; F04C 14/22; F04C 14/26; F04C 14/12; F04C 14/223; F04C 14/226;
(Continued)

(56) References Cited

U.S. PATENT DOCUMENTS

| 2,540,628 A * | 2/1951 | Miller ................... F01M 5/007 |
| | | 236/12.23 |
| 2,575,100 A * | 11/1951 | Duey .......................... 236/93 R |
| 2,716,946 A * | 9/1955 | Hardy ........................... 417/213 |
| 2,768,585 A * | 10/1956 | Hardy ........................... 417/213 |

(Continued)

FOREIGN PATENT DOCUMENTS

| CN | 101084378 A | 12/2007 |
| CN | 101379296 A | 3/2009 |

(Continued)

*Primary Examiner* — Essama Omgba
*Assistant Examiner* — Charles W Nichols
(74) *Attorney, Agent, or Firm* — Norman B. Thot

(57) ABSTRACT

A variable-displacement lubricant pump includes a first plunger. A control ring is pushed by the first plunger in a high pumping volume direction. The first plunger is arranged in a first control chamber with a side wall. A first pressure conduit connects a pump outlet port with the first control chamber. A pumping volume limitation unit is arranged so that the first plunger covers and closes an outlet opening arranged in the side wall in a lower pumping volume position of the control ring. A thermostatic element actuates a temperature controlled valve based on lubricant temperature. The thermostatic element pushes a shiftable valve body against a retraction spring to an extended closed end position when the lubricant has an operation temperature. The shiftable valve body is in a retracted closed end position at a cold lubricant temperature and in an intermediate open position at an intermediate lubricant temperature.

11 Claims, 3 Drawing Sheets

(52) U.S. Cl.
CPC ..... *F16N 13/20* (2013.01); *F01M 2001/0246* (2013.01); *F04C 2/344* (2013.01); *F04C 2240/81* (2013.01); *F04C 2270/19* (2013.01); *F04C 2270/701* (2013.01)

(58) Field of Classification Search
CPC ........ F04C 28/18; F04C 28/22; F04C 2/3441; F04C 2/348; F04C 2270/18; F04C 2270/19; F04C 2270/185; F04C 2270/195; F16N 13/00; F16N 13/18; F16N 11/08; F16N 7/38; F16N 7/385
USPC ........................................ 417/220; 123/41.35
See application file for complete search history.

(56) References Cited

U.S. PATENT DOCUMENTS

| | | | | |
|---|---|---|---|---|
| 4,249,491 | A | * | 2/1981 | Stein ........................ 123/142.5 R |
| 6,101,987 | A | * | 8/2000 | Saur ........................ F01P 7/048 |
| | | | | 123/41.1 |
| 2002/0148416 | A1 | * | 10/2002 | Cohen ........................ 123/41.1 |
| 2005/0224031 | A1 | | 10/2005 | Knight et al. |
| 2008/0069704 | A1 | * | 3/2008 | Armenio et al. ............. 417/310 |
| 2010/0221126 | A1 | | 9/2010 | Tanasuca et al. |
| 2010/0329912 | A1 | | 12/2010 | Williamson et al. |

FOREIGN PATENT DOCUMENTS

| | | | |
|---|---|---|---|
| DE | 10 2006 049 620 A1 | 4/2008 | |
| GB | 2 077 396 A | 12/1981 | |
| JP | 2004 308578 A | 11/2004 | |
| WO | WO 2005/068838 A1 | 7/2005 | |
| WO | WO2007/015135 | * 2/2007 | .............. F04C 14/22 |

\* cited by examiner

VARIABLE-DISPLACEMENT LUBRICANT VANE PUMP

CROSS REFERENCE TO PRIOR APPLICATIONS

This application is a U.S. National Phase application under 35 U.S.C. §371 of International Application No. PCT/EP2010/060993, filed on Jul. 29, 2010. The International Application was published in English on Feb. 2, 2012 as WO 2012/013232 A1 under PCT Article 21(2).

FIELD

The present invention relates to a variable-displacement lubricant vane pump for an internal combustion engine, the pump comprising a rotor with radially slidable vanes rotating in a shiftable control ring, wherein the control ring can be pushed by a first plunger pushing the control ring in a high pumping volume direction.

BACKGROUND

A variable-displacement vane pump of the state of the art is described in WO 2005/068838 A1. The pump is provided with a pressure control system for controlling the discharge pressure of the lubricant at the pump outlet port. The pressure control system comprises a first control chamber wherein a first plunger is provided being radially movable. The first control chamber is connected via a first pressure conduit with the pump outlet port. The pressure control system also comprises a separate pressure control valve which is realized as a cylinder-piston-element which keeps the delivery pressure of the pressurized lubricant provided at the pump outlet port at a more or less constant level. This is realized by opening and closing an outlet of the control chamber, thereby allowing the control ring to move into a low pumping volume direction or being pushed into a high pumping volume direction. The pressure control system controls the delivery pressure independently of the lubricant temperature.

The pump is also provided with a pumping volume limitation unit which makes it possible to limit the maximum pumping volume while the lubricant is cold. The pumping volume limitation unit comprises an outlet opening in a side wall of the control chamber, whereby the outlet opening and the first plunger are arranged so that the first plunger covers, and thereby closes, the outlet opening in the lower pumping volume position of the control ring. The volume limitation unit outlet opening is connected to atmospheric pressure via an electric valve which is controlled by a central control unit. The central control unit opens the electric valve when the lubricant is cold and closes the valve when the lubricant is warm. The pumping volume limitation unit is relatively complex and not fail-safe.

SUMMARY

An aspect of the present invention is to provide a variable-displacement lubricant pump with a simple and reliable pumping volume limitation unit.

In an embodiment, the present invention provides a variable-displacement lubricant pump for providing a pressurized lubricant for an internal combustion engine which includes a first plunger configured to be radially movable. A control ring is configured to be radially shiftable and to be pushed by the first plunger in a high pumping volume direction. A rotor comprises radially slidable vanes which are configured to rotate in the control ring. A first control chamber comprises a side wall. The first plunger is arranged in the first control chamber. A first pressure conduit is configured to connect a pump outlet port with the first control chamber. A pumping volume limitation unit comprises an outlet opening arranged in the side wall of the first control chamber. The outlet opening and the first plunger are arranged so that the first plunger covers and closes the outlet opening in a lower pumping volume position of the control ring. A temperature controlled valve is configured to be actuated by a thermostatic element based on a lubricant temperature. The outlet opening is connected to an atmospheric pressure when the temperature controlled valve is actuated by the thermostatic element. The thermostatic element is configured to push a shiftable valve body against a force of a retraction spring to an extended closed end position when the lubricant has an operation temperature. The shiftable valve body is in a retracted closed end position at a cold lubricant temperature. The shiftable valve body is in an intermediate open position at an intermediate lubricant temperature.

BRIEF DESCRIPTION OF THE DRAWINGS

The present invention is described in greater detail below on the basis of embodiments and of the drawings in which.

DETAILED DESCRIPTION

Figure 1:
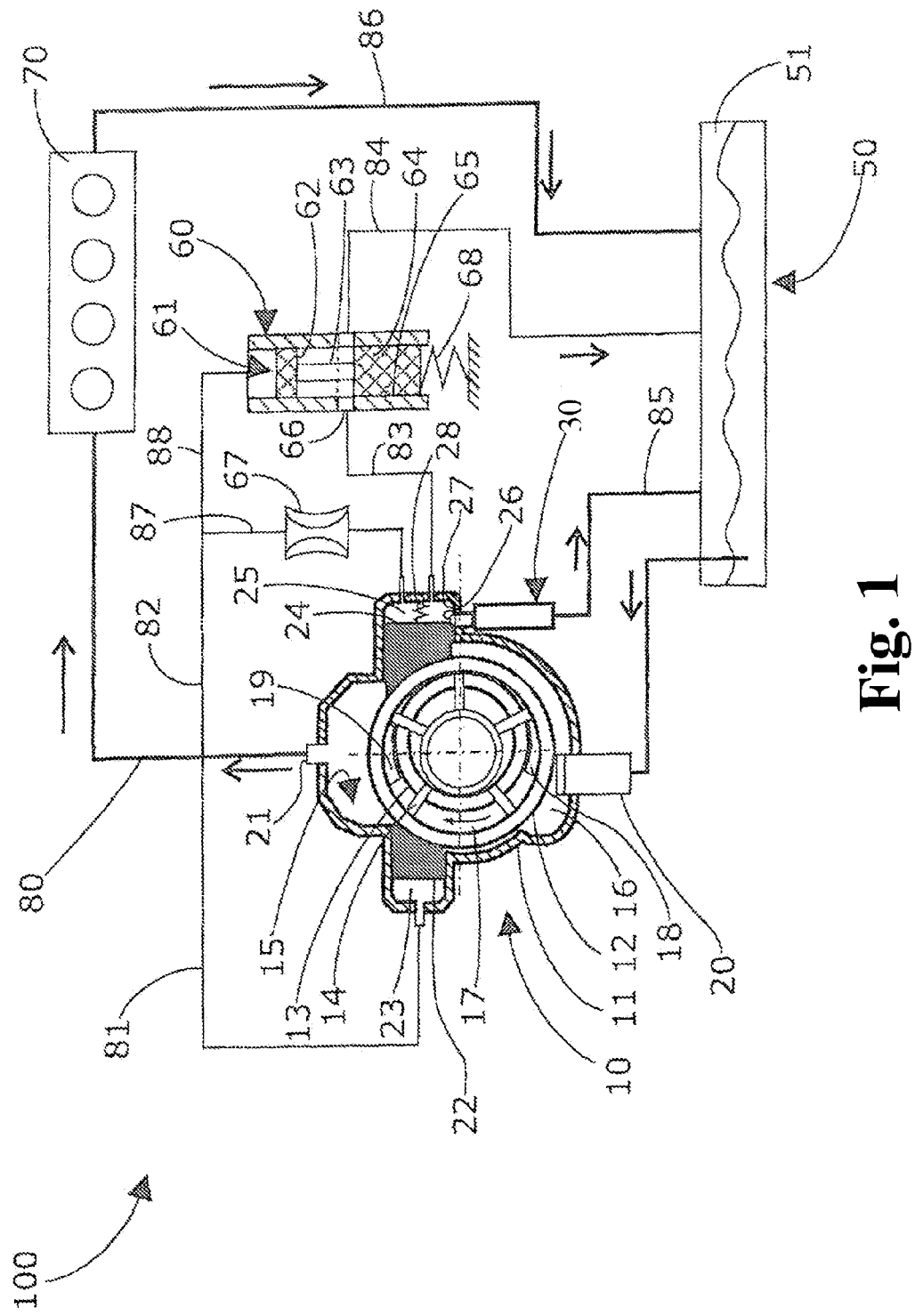
FIG. 1 shows a schematic overview of an internal combustion engine with a variable-displacement lubricant pump for providing pressurized lubricant to the engine.

A pumping volume limitation unit of the variable displacement lubricant pump according to the present invention is provided with an outlet opening in a side wall of the first control chamber wherein the first plunger is provided radially movable. The first plunger can be the control ring itself surrounded by a pump housing forming the control chamber or can be a classical plunger moving linearly in a respective cylinder forming the control chamber. The control ring can be provided linearly shiftable or pivotable.

The outlet opening of the pumping volume limitation unit is arranged at the side wall of the control chamber so that the respective plunger covers and thereby closes the outlet opening in a low pumping volume position of the control ring. The outlet opening of the pumping volume limitation unit is connected to atmospheric pressure, for example, to a lubricant tank, via a temperature controlled valve. The temperature controlled valve is a mechanical valve which is actuated by thermostatic element affected by the lubricant temperature. The thermostatic element pushes a shiftable valve body against the force of a retraction spring to an extended end position when the lubricant reaches the operating temperature. The valve is closed in the extended end position. As long as the lubricant is cold, the valve body remains in a retracted end position in which the valve is also closed. The valve is open only in an intermediate position of the valve body. The valve body is in the intermediate open position when the lubricant temperature is between the cold and the operating temperature, i.e., when the lubricant is at an intermediate temperature.

If the thermostatic element fails or becomes damaged, the retraction spring forces the valve body into the retracted closed end position in which the temperature controlled valve is closed. The temperature controlled valve is therefore fail-safe. A mechanical temperature control valve with a mechanical thermostatic element is simple, reliable and cost-effective.

The thermostatic element can be a bimetal element or any other mechanical thermostatic element. In an embodiment of the present invention, the thermostatic element can, for example, be a wax element. The wax element is a cost-effective and reliable thermostatic element which is able to generate a relatively high pressure to push the valve body into the extended closed end position.

In an embodiment of the present invention, the wax element can, for example, comprise two different waxes of different main stroke temperatures which makes it possible to define an intermediate valve body position for a relatively wide intermediate temperature range. In an embodiment of the present invention, one wax can, for example, have a main stroke temperature of between 5° C. and 20° C., and the other wax can, for example, have a main stroke temperature of between 90° C. and 105° C. With this constitution of the wax element, the valve body is in the intermediate open position, at lubricant temperatures between, for example, 20° C. and 100° C. In case the wax element should become leaky or the lubricant temperature is below 5° C. to 20° C., the retraction spring pushes the valve body into the closed retracted end position.

In an embodiment of the present invention, the valve body can, for example, be a sleeve with an axial inlet and a radial outlet opening which is in-line with a radial outlet opening of the valve housing when the valve body is in the intermediate open position. The radial outlet opening of the valve body and/or of the valve housing can be a circumferential slit to provide an open lubricant passage when the outlet openings of the valve body and of the valve housing are axially in-line and independently of the circumferential orientation of the valve body.

In an embodiment of the present invention, the valve sleeve can, for example, be directly actuated and pushed into the retracted end position by the retraction spring.

In an embodiment of the present invention, a second control chamber and a second plunger connected to the control ring can, for example, both be provided opposite the first control chamber and the first plunger. The second control chamber is connected by a pressure conduit with the pump outlet. The first plunger of the first control chamber can, for example, be pushed by a preload spring into the high pumping volume direction of the control ring.

In an embodiment of the present invention, a pressure throttle valve can, for example, be provided in the first pressure conduit. This throttle valve reduces the lubricant consumption of the pressure control system of the lubricant pump and is a part of the pressure control system.

In an embodiment of the present invention, another discharge conduit between the first control chamber and the ambient pressure can, for example, be provided which is not affected by the pumping volume limitation unit and forms a second control circuit. The discharge conduit is controlled by a pressure control valve which is open at a high lubricant pressure and is closed at a low lubricant pressure of the discharged lubricant. This second control circuit limits the lubricant discharge pressure to an absolute maximum pressure.

The temperature controlled valve can, for example, be provided with an electrical heating element which allows for an active heating of the thermostatic element and for a reduction of the pumping volume limitation time during the warm-up of the internal combustion engine.

FIG. 1 shows a variable displacement lubricant pump 10 as a part of a pumping system 100 for supplying an internal combustion engine 70 with a lubricant. The pump comprises a pump housing 11 having a cavity 16 in which a radially shiftable control ring 12 translates.

The control ring 12 encircles a pump rotor 13 which is provided with numerous radially slidable vanes 14, whereby the vanes 14 are rotating inside the control ring 12. The pump housing 11 is closed by two pump side walls 15 of which one is not shown in FIG. 1. The pump side walls 15, the vanes 14, the pump rotor 13 and the control ring 12 define five rotating pump chambers 17. One of the side walls 15 is provided with a pump chamber inlet opening 18 and with a pump chamber outlet opening 19.

The control ring 12 is provided with a first plunger 24 housed in part in a first pressure control chamber 25 and with a second plunger 22 housed in part in a second pressure control chamber 23 opposite to the first pressure control chamber 25.

A preload spring 28 inside the first pressure control chamber 25 exerts a pushing force to the first plunger 24. Both pressure control chambers 25, 23 are formed in the pump housing 11. The pump housing 11 also comprises an intake port 20 for sucking the lubricant from a lubricant tank 50 and a pump outlet port 21 for feeding lubricant with a discharge pressure to the engine 70. A supply conduit 80 leads from the pump outlet port 21 to the engine 70. A return conduit 86 leads from the engine 70 to the lubricant tank 50.

The lubricant, which is supplied to the engine 70, is conducted to the second pressure control chamber 23 via a pressure conduit 81, and the lubricant is fed to the first pressure control chamber 25 via pressure conduits 82, 87. More specifically, the lubricant in pressure conduit 82 is finally fed to the first pressure control chamber 25 via pressure conduit 87 through a pressure throttle valve 67 in which a calibrated pressure drop occurs as the lubricant flows through.

The pressure conduit 82 is connected to a control port of a first pressure control valve 60 by a conduit 88. The pressure control valve 60 comprises a cylinder 65 housing a piston 61. More specifically, the piston 61 comprises a first portion 62 and a second portion 64 connected to each other by a rod 63. The piston portions 62 and 64 are in cross section equal to the cross section of the cylinder 65, whereas the rod 63 is smaller in cross section than the cylinder 65. The piston 61 is pre-tensioned by a pre-tentioning element 68.

The cylinder 65 has an inlet port 66 connected hydraulically to the first pressure control chamber 25 by a conduit 83. The conduit 88 provides the discharge pressure from pressure conduit 82 to the control port and thereby to the front surface of the first portion 62 of piston 61. The dash line in FIG. 1 shows the situation when the inlet port 66 of the first pressure control valve 60 is closed by the second portion 64 of the piston 61.

The first pressure control chamber 25 is provided with a first control chamber outlet opening 26 connected hydraulically to a pumping volume limitation unit 40. The first control chamber outlet opening 26 is provided in a side wall 27 of the first pressure control chamber 25 so that the first plunger 24 opens and closes the first control chamber outlet opening 26 dependent on the plunger position.

The control of the pumping volume of the pump 10 is, in addition to the pressure control valve 60, also controlled by the pumping volume limitation unit 40 which limits the pumping volume as long as the lubricant has not reached the operation temperature. The pumping volume limitation unit 40 comprises the first control chamber outlet opening 26 and a temperature controlled valve 30.

Figure 2:
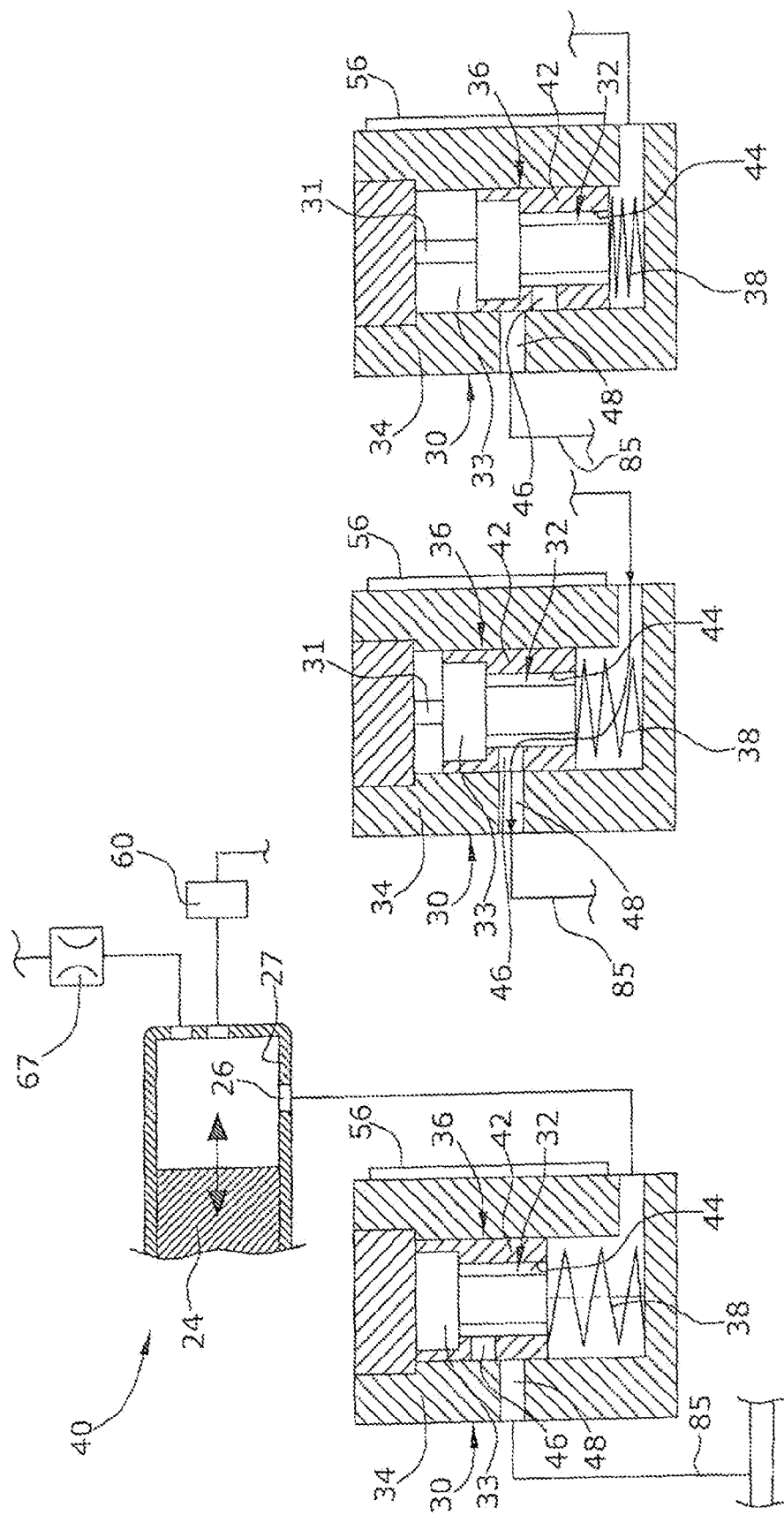
FIGS. 2a to 2c schematically show a pumping volume limitation unit of the lubricant pump of FIG. 1 in three different opening positions.
Figure 3:
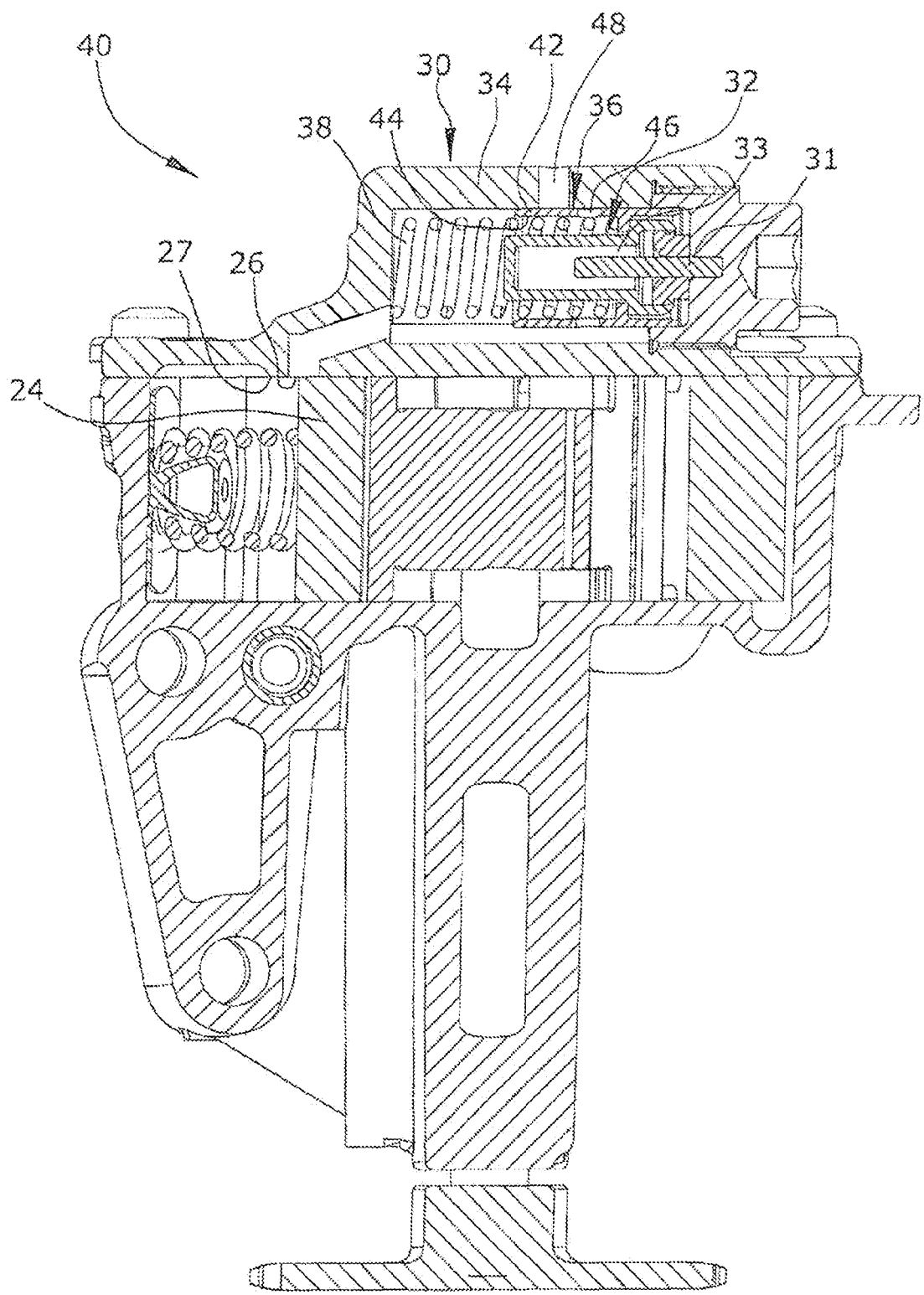
FIG. 3 shows a longitudinal section of the pumping volume limitations unit of FIG. 1.

The first control chamber outlet opening 26 is arranged in the control chamber side wall 27 so that the first control chamber outlet opening 26 is covered and thereby closed by the shifting first plunger 24 in a low pumping volume position of the control ring 12 and is not covered and thereby left open in a high pumping volume position of the control ring 12. The first control chamber outlet opening 26 is connected to atmospheric pressure 51 of the lubricant tank 50 via the temperature controlled valve 30, which is shown in detail in FIGS. 2 and 3, and a conduit 85.

When the temperature controlled valve 30 is open, the pumping volume is limited to an intermediate pumping volume value because the first plunger 24 moving the control ring 12 cannot exceed the first control chamber outlet opening 26 into the maximum pumping volume direction.

The temperature controlled valve 30 is actuated by a thermostatic element 32 which is a thermostatic wax element 33 including an actuation rod 31. The thermostatic wax element 33 comprises a mixture of two different waxes of different main stroke temperatures of 10° C. and of 100° C. The temperature controlled valve 30 comprises a valve housing 34 in which a shiftable valve body 36 is provided which is directly pushed by a retraction spring 38 into a retracted closed end position which is shown in FIG. 2*a*.

The shiftable valve body 36 is a sleeve 42 with an axial inlet 44 and a radial sleeve outlet 46 which is a circumferential slit. The valve housing 34 is provided with a radial outlet opening 48 which is a circumferential slit. The radial sleeve outlet 46 and the and radial outlet opening 48 are in alignment to each other in an intermediate open position of the valve body 36 which is shown in FIG. 2*b*. The valve body 36 is in the intermediate open position at intermediate lubricant temperatures between 10° C. and 100° C. In this intermediate open position the lubricant can flow from the first control chamber 25 through the temperature controlled valve 30 to the lubricant tank 50 as long as the first control chamber outlet opening 26 is not totally covered by the first plunger 24. When the lubricant temperature is higher than 100° C., the valve body 36 is pushed by the thermostatic element 32 into the extended closed end position shown in FIG. 2*c* so that the temperature controlled valve 30 is closed.

At intermediate lubricant temperatures between 10° C. and 100° C., the pumping volume limitation unit 40 is open so that the pumping volume of the lubricant pump 10 is limited to an intermediate pumping volume value. In case the thermostatic wax element 33 should be leaky, the valve body 36 is pushed by the retraction spring 38 into the retracted closed end position shown in FIG. 2*a*, so that the pumping volume limitation unit 40 is closed and thereby is fail-safe.

The temperature controlled valve 30 is provided with an electric heating element 56 which can be switched on to reduce the low pumping volume limitation time after the respective engine has been started.

The present invention is not limited to embodiments described herein; reference should be had to the appended claims.

What is claimed is:

1. A variable-displacement lubricant pump for providing a pressurized lubricant for an internal combustion engine, the variable-displacement lubricant pump comprising:

a first plunger configured to be radially movable;
a control ring configured to be radially shiftable and to be pushed by the first plunger in a high pumping volume direction;
a rotor comprising radially slidable vanes which are configured to rotate in the control ring;
a first control chamber comprising a side wall, the first plunger being arranged in the first control chamber;
a pump outlet port;
a first pressure conduit configured to connect the pump outlet port with the first control chamber;
a pumping volume limitation unit comprising:
  an outlet opening arranged in the side wall of the first control chamber, the outlet opening and the first plunger being arranged so that the first plunger covers and closes the outlet opening in a lower pumping volume position of the control ring;
  a thermostatic element; and
  a temperature controlled valve configured to be actuated by the thermostatic element based on a lubricant temperature;
  wherein the outlet opening is connected to an atmospheric pressure when the temperature controlled valve is actuated by the thermostatic element;
a shiftable valve body; and
a retraction spring;
wherein the thermostatic element is configured to push the shiftable valve body against a force of the retraction spring to an extended closed end position when the lubricant has an operation temperature,
the shiftable valve body is in a retracted closed end position at a cold lubricant temperature, and
the shiftable valve body is in an intermediate open position at an intermediate lubricant temperature.

2. The variable-displacement lubricant pump as recited in claim 1, wherein the thermostatic element is a wax element.

3. The variable-displacement lubricant pump as recited in claim 2, wherein the wax element comprises a first wax and a second wax, the first wax and the second wax having different main stroke temperatures.

4. The variable-displacement lubricant pump as recited in claim 3, wherein the first wax has a main stroke temperature of between 5° C. and 20° C., and the second wax has a main stroke temperature of between 90° C. and 105° C.

5. The variable-displacement lubricant pump as recited in claim 1, further comprising a valve housing comprising a radial outlet opening, wherein the shiftable valve body is a sleeve comprising an axial inlet and a radial outlet, the axial inlet and the radial outlet being arranged with the radial outlet opening of the valve housing in the intermediate open position.

6. The variable-displacement lubricant pump as recited in claim 5, wherein the sleeve is configured to be pushed directly by the retraction spring into the retracted closed end position.

7. The variable-displacement lubricant pump as recited in claim 1, further comprising a pressure conduit, a second control chamber and a second plunger, wherein the second control chamber and the second plunger are arranged opposite the first control chamber and the first plunger, and the second control chamber is connected by the pressure conduit with the pump outlet port.

8. The variable-displacement lubricant pump as recited in claim 1, further comprising a preload spring, wherein the first plunger is configured to be pushed by the preload spring into the high pumping volume direction.

9. The variable-displacement lubricant pump as recited in claim 1, further comprising a pressure throttle valve arranged in the first pressure conduit.

10. The variable-displacement lubricant pump as recited in claim 1, further comprising a pressure control valve and a discharge conduit arranged between the first control chamber and a low pressure, the discharge conduit being configured to be controlled by the pressure control valve, and the pressure control valve being configured to be open at a high delivery pressure and to be closed at a low delivery pressure.

11. The variable-displacement lubricant pump as recited in claim 1, further comprising an electrical heating element which is configured to heat the temperature controlled valve.

* * * * *